(12) United States Patent
He et al.

(10) Patent No.: US 12,481,707 B2
(45) Date of Patent: Nov. 25, 2025

(54) SYSTEM FOR OPTIMIZING TRAINING DATASET

(71) Applicant: Infrrd Inc, San Jose, CA (US)

(72) Inventors: Jianglong He, Elmhurst, NY (US); Deepak Kumar, Bengaluru (IN)

(73) Assignee: Infrrd Inc

( * ) Notice: Subject to any disclaimer, the term of this patent is extended or adjusted under 35 U.S.C. 154(b) by 719 days.

(21) Appl. No.: 17/817,014

(22) Filed: Aug. 3, 2022

(65) Prior Publication Data

US 2023/0128876 A1    Apr. 27, 2023

Related U.S. Application Data

(62) Division of application No. 17/817,012, filed on Aug. 3, 2022.

(51) Int. Cl.
| | | |
|---|---|---|
| *G06F 16/906* | (2019.01) | |
| *G06F 16/901* | (2019.01) | |
| *G06F 16/93* | (2019.01) | |
| *G06N 3/045* | (2023.01) | |
| *G06N 3/08* | (2023.01) | |
| *G06N 3/09* | (2023.01) | |

(52) U.S. Cl.
CPC ........ *G06F 16/906* (2019.01); *G06F 16/9024* (2019.01); *G06F 16/93* (2019.01); *G06N 3/045* (2023.01); *G06N 3/08* (2013.01); *G06N 3/09* (2023.01)

(58) Field of Classification Search
CPC .... G06F 16/906; G06F 16/93; G06F 16/9024; G06N 3/08; G06N 3/042; G06N 3/045; G06N 3/084; G06N 3/088; G06N 3/09
See application file for complete search history.

(56) References Cited

U.S. PATENT DOCUMENTS 11,727,062 B1 *  8/2023  Gaskell .................. G06N 3/082
                                                707/798

OTHER PUBLICATIONS

S. Jung and S. Ka, "GAE-Based Document Embedding Method for Clustering," in IEEE Access, vol. 10, pp. 130089-130096, 2022.*

* cited by examiner

*Primary Examiner* — Asher D Kells (57) ABSTRACT

System for optimizing training dataset comprising sample documents. The system comprises one or more processors configured to create graph embedding vector for each of the sample documents of the training dataset and cluster the graph embedding vectors of the sample documents of the training dataset into clusters based on the similarity between the graph embedding vectors. Further, the processor is configured to select a first set of training data, using an optimization model, wherein the first set of training data comprises a finite number of graph embedding vectors of the sample documents from the clustered training dataset. Finally, the first set of training data is fed as for a machine learning model.

9 Claims, 13 Drawing Sheets

ORG

ADDRESS

504

ORG
ADDRESS

INVOICE NO
DATE

TOTAL

SYSTEM FOR OPTIMIZING TRAINING DATASET

CROSS REFERENCE

The present application is a division of application Ser. No. 17/817,012 filed on 3 Aug. 2022, entitled SYSTEM FOR GRAPH-BASED CLUSTERING OF DOCUMENTS.

FIELD OF INVENTION

The disclosed subject matter relates to the field of document template identification and classification. More particularly, but not exclusively, the subject matter relates to the field of processing the digital documents to be fed as input for a machine learning model.

BACKGROUND

Discussion of Prior Art

The rise of internet and the computerized systems has pushed the world into a digital era where the conventional manually enabled processes are automized using digital systems thereby improving the accuracy and efficiency of the processes. One such field that has seen this transformation is handling of documents to classify the documents, wherein computerized systems are used to digitally process the documents to classify the documents accurately. These systems must be equipped with the capacity to process different types of documents having different templates.

As an example, documents such as application forms, and financial transactions bills vary from one document to another document and each document carries specific information related to the document itself. One of the specific information in the document may be the company logo or name. The information may be unique to the document as well as similar to the other documents. The specific information can be grouped into unique and non-unique information. The unique information may be a transaction number or the date and time when the document was generated. For example, some of the non-unique or similar information such as 'date', 'time', and 'price' may be explicitly mentioned in the document. As an example, this kind of document includes print-out receipt for items purchased in a shop. Similarly, the common information across an application form carries these general terms namely name, age, sex, and address. The text present in the form specifies the spatial location or place, where the relevant information has to be filed in place of the blank space in the document. The location of the text would have been decided by the document creator to collect or record the information from the document users. The location of the text varies from document to document. The variation of text may be in the form of unique information or non-unique information. If there is no variation in the location of non-unique and same textual information, then the documents can be grouped together and assume that the grouped documents belong to a particular kind of structure which is referred to as a template. When the location of non-unique information may or may not be the same and varies between the documents, then we can assume that the documents belong to different templates. The non-unique information has to be the same in terms of text to form a template.

In order to train a language model or a machine learning model or a machine to understand all the possible complex variations for a particular template, then it is necessary to provide the training samples from that particular template that covers most of the variations. One of the conventional ways to select documents belonging to a particular template from a group of documents is by clustering of the documents into groups based on templates. This is done by selecting a specific document and then comparing it with others in the group. This clustering operation enables in improving the performance of a machine learning model by training the model on a particular template with most of the variations from the training data set.

Typically, a couple of image-based processing algorithms are used to group the documents, which are dependent on the image-based features to cluster the documents. The image-based features are extracted from the region of interest in the document and used as a reference for grouping similar documents.

Similar approach has been extended to grouping documents based on word features using word vectors. The words in a document may include unique text and non-unique text. The problem arises when the digital document is a scanned copy of a document and not digitally born document. There may be errors while performing OCR operations. The errors are erratic and may appear at random places. Therefore, there is a need to reduce the dependence on the non-unique and common texts.

Therefore, there is need for a clustering approach that considers the structural information of the document for grouping similar documents to overcome the drawbacks of the conventional systems.

The documents used in the automation process may be of different types, like application forms, request forms, financial statements, authorization forms, and many more. The scanned copies of the original document, digitally generated documents, or camera-captured documents are the documents that are part of the automation process. A single type of document comes with several variations or changes. Why? Initially, a document may contain general information that doesn't reflect a specific condition. Let us consider, an example, an address filled in the form without explicitly mentioning the city or the nearest city. If the document creator wants to collect the city information, then it will be covered in the document. So, a single type of document gets new additions to the list of variations in the document. The number of variations in the documents keeps growing. There is no end to the possible additions like an amendment to a byelaw. A single type has a lot of complexities that may be difficult to understand by a model. When different types of documents are combined, then the complexity of the model training increases by many folds. Here, we present a typical example of the types of documents.

Typically, to train a machine learning model, a set of documents are used as samples. One of the most prominent challenges regarding the training samples is variations within a document type and various document types. The documents within the set of documents may differ and cause a lot of ambiguity and confusion for the machine learning model. For example, the model may assume that the date comes after the identification number in a few documents, and the date may not appear after the identification number in the others. The model predicts the date with a probability score. Whenever the score is higher, then any number coming after the identification number is considered a date by the model. This error produced by the model could be avoided by performing a filtering operation on all the documents. The documents received for training should be processed before passing them into the model. It reduces the amount of complexity involved in the training process.

In a conventional system, during training a machine learning model, the clustered training data is used as an input. All the samples from each of the clusters is fed as input to the model to identify a document belonging to the cluster. Inputting all the samples even though the model as started to predict the document correctly is an unnecessary process and consumes enormous computational time.

Hence, there is a need for a system to select appropriate samples and an appropriate number of samples to be fed as input to the machine learning model so that the draw backs of the existing systems are overcome.

SUMMARY

In an embodiment, a system for graph-based clustering of documents is disclosed. The system comprises one or more processors configured to receive a digital copy of a document to convert the document into a graph object. Further, the processor is configured to identify and label entities in the document, wherein each of the entities is represented as a node of the graph object. Further, the processor is configured to create the graph object for the received digital copy of the document and generate a graph embedding vector using a graph embedding neural network trained to receive the graph object as input and generate the graph embedding vector for the graph object as output. Finally, the processor is configured to cluster the graph embedding vector to a cluster comprising similar looking templates of the document.

In an embodiment, a system for optimizing training dataset comprising sample documents is disclosed. The system comprises one or more processors configured to create graph embedding vector for each of the sample documents of the training dataset and cluster the graph embedding vectors of the sample documents of the training dataset into clusters based on the similarity between the graph embedding vectors. Further, the processor is configured to select a first set of training data, using an optimization model, wherein the first set of training data comprises a finite number of graph embedding vectors of the sample documents from the clustered training dataset. Finally, the first set of training data is fed as for a machine learning model.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
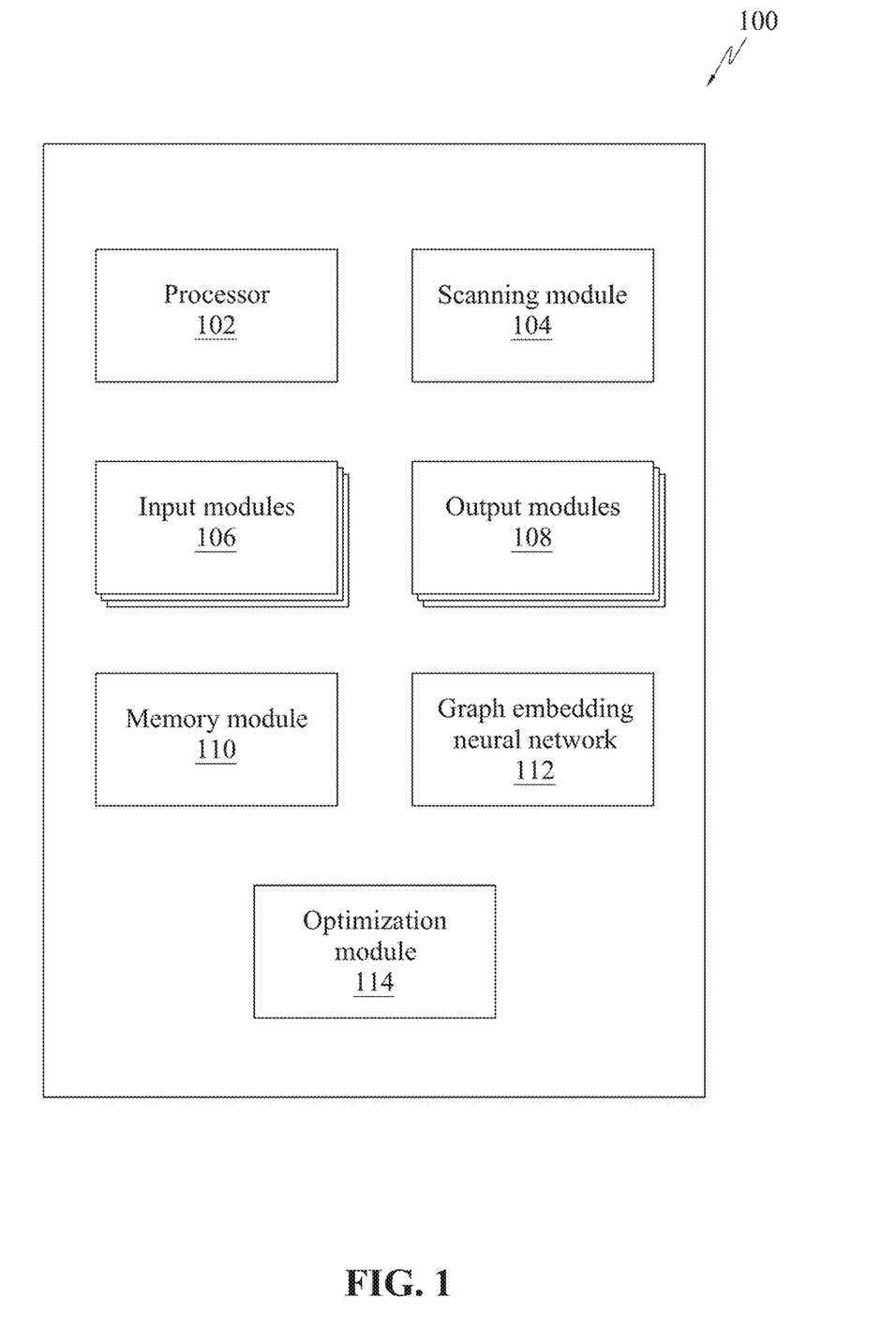
FIG. 1 illustrates a block diagram of a system 100 for processing the digital copies of documents.

FIG. 1 illustrates a block diagram of a system 100 for processing the digital copies of documents. The system 100 may comprise of one or more processor 102, a scanning module 104, input modules 106, output modules 108, a memory module 110, a graph embedding neural network 112 and an optimization module 114.

In an embodiment, the processor 102 may be implemented in the form of one or more processors 102 and may be implemented as appropriate in hardware, computer-executable instructions, firmware, or combinations thereof. Computer-executable instruction or firmware implementations of the processor 102 may include computer-executable or machine-executable instructions written in any suitable programming language to perform the various functions described.

In an embodiment, the scanning module 104 may be configured to scan a document and further convert it into a computer-readable format.

In an embodiment, the input modules 106 may provide an interface for input devices such as keypad, touch screen, mouse and stylus among other input devices. The input modules 106 may include camera or scanner.

In an embodiment, the output modules 108 may provide an interface for output devices such as display screen, speakers, printer and haptic feedback devices, among other output devices.

In an embodiment, the memory module 110 may include a permanent memory such as hard disk drive, may be configured to store data, and executable program instructions that are implemented by the processor 102. The memory module 110 may be implemented in the form of a primary and a secondary memory. The memory module 110 may store additional data and program instructions that are loadable and executable on the processor 102, as well as data generated during the execution of these programs. Further, the memory module 110 may be volatile memory, such as random-access memory and/or a disk drive, or non-volatile memory. The memory module 110 may comprise of removable memory such as a Compact Flash card, Memory Stick, Smart Media, Multimedia Card, Secure Digital memory, or any other memory storage that exists currently or may exist in the future.

In an embodiment, the graph embedding neural network 112 may be configured to generate a graph embedding of a graph object corresponding to a document.

In an embodiment, the optimization module 114 may be configured to optimize the clustered documents.

Figure 2:
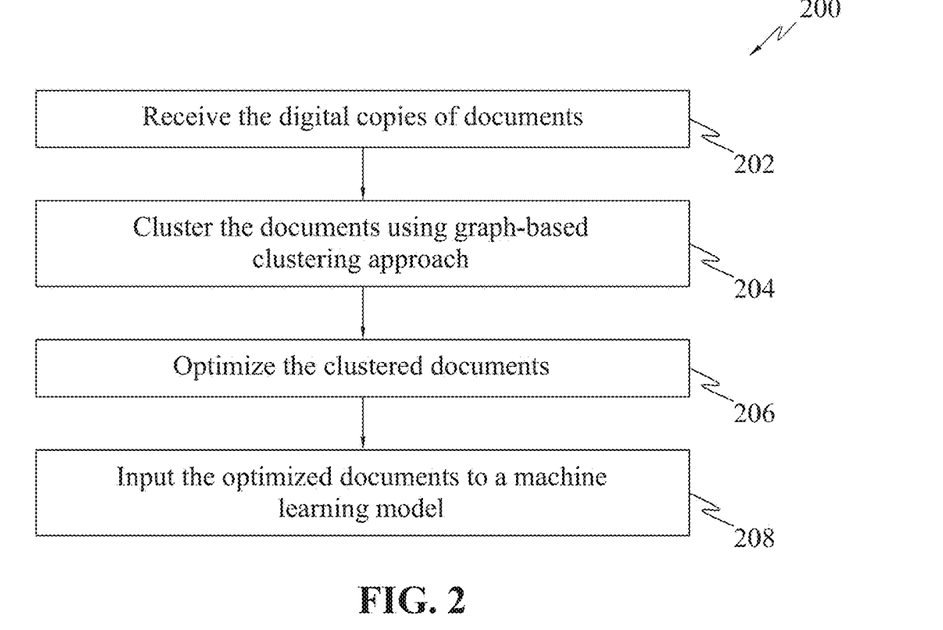
FIG. 2 is a flowchart 200 of a method of processing the digital copies of documents.

FIG. 2 is a flowchart of a method of processing the digital copies of documents. At step 202, the digital copies of the input documents to be fed as input to the machine learning is received by the processor 102.

At step 204, the received documents may be clustered by the processor 102 using a graph-based clustering process. The graph-based clustering process will be explained in greater detail later. The outcome of the graph-based clustering process is that the documents are clustered into clusters, wherein each clusters includes documents belonging to a similar template.

At step 206, the processor 102 may be configured to optimize the clustered documents using the optimization module 114. The optimization of the documents will be explained in a greater detail later.

At step 208, the optimized documents are fed as an input to the machine learning model for classifying the documents or named entities within the documents.

Graph-Based Clustering Approach for Grouping Documents

Figure 3:
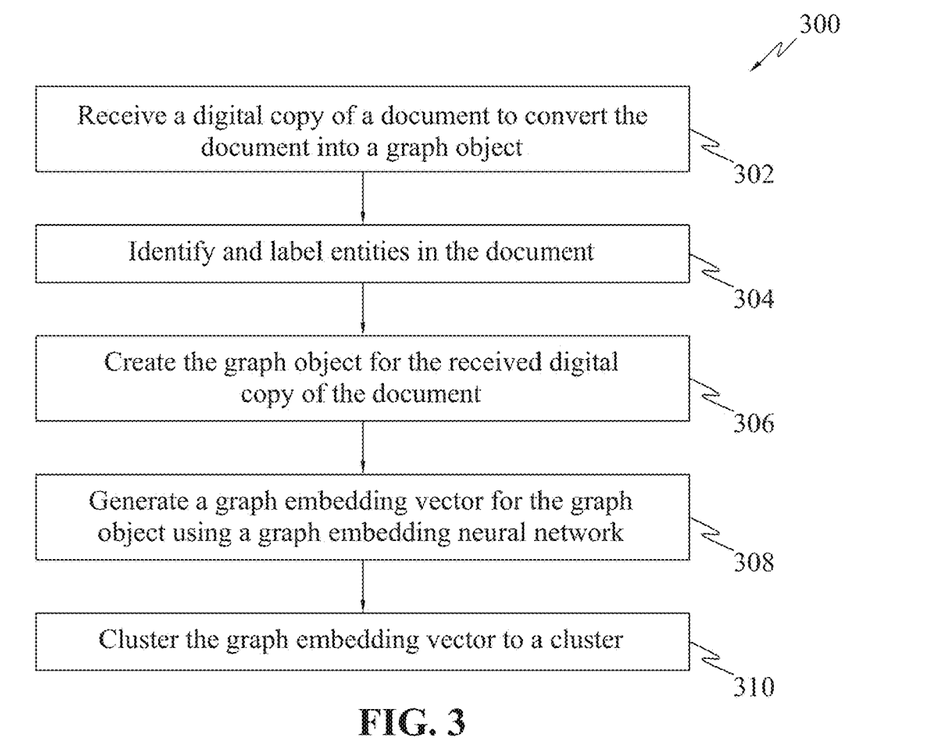
FIG. 3 is a flowchart 300 of a method of graph-based clustering approach for grouping documents.

FIG. 3 is a flowchart of a method of graph-based clustering approach for grouping documents. At step 302, the processor 102 may be configured to receive a digital copy of a document that is to be converted into a graph object.

At step 304, the processor 102 may be configured to identify and label entities in the document, wherein each of the entities in the document are represented as a node of the graph object.

In one embodiment, the labelling of the entities in the document may be manually performed by a human user.

In one embodiment, the labelling of the entities in the document may be performed by a supervised learning-based machine learning model. A Generic Named Entity Recognition (GNER) engine is configured to label the documents automatically without manual intervention. The engine may be trained to label different types of general entities such as a person, location, organization, amount, date, and time. The use of the GNER engine, enables speeding up of the overall process of grouping the documents which are complex in nature. The entity information from the engine is used to create the graph nodes representing the graph object of a document. The GNER engine speeds up the process of labelling entities either by manual annotation or by training a supervised machine learning model.

At step 306, the processor 102 may be configured to create the graph object for the received digital copy of the document. The graph object for the document may be created by connecting each of the nodes representing an entity with its neighbouring nodes along four directions. The four directions may be top, bottom, left, right.

In one embodiment, the cartesian coordinate system is used to relate the nodes like x, y, w, and h, wherein x stands for the position of the node from the left of the document, y stands for the position of the node from the top of the document, and w stands for the width of the node, and h stands for the height of the node.

Upon connecting each of the nodes with its neighbouring nodes, edges may be formed between each of the nodes and its neighbouring nodes along four directions.

The edges may be formed between the nodes based on the relative position of each of the nodes with its neighbouring nodes.

In another embodiment, the difference between two graph objects corresponding to two documents may be measured. In order to do that, the graph edit distance (GED) between the graph objects may be computed. GED is a measure of the nodes which are deleted, inserted, or substituted. Whenever, a delete, insertion, or substitution operation is performed, a certain amount of cost is added to the measurement in terms of graph edit distance. The GED computation is an NP-hard problem because nodes that do not carry any relevant information between the documents which are supposed to be part of the nodes are used. Using the entity type information which is present in the node, a node from one document is compared against the nodes in the other document. The semantic information of entity type as part of the node information may reduce the comparison from all the nodes in the other document to a set of limited nodes which match the entity type. The cost between all the nodes is computed which is stored in a two-dimensional matrix form and then a least-square fit algorithm is applied using the delete, insertion, or substitution operation to compute the lowest GED between the two documents.

Typically, the computation of GED cost between two documents is time consuming. For example, considering there are 10 documents to cluster, then the GED cost between and for all the 10 documents must be computed. Suppose, the time consumed to compute GED cost is 'x' units. The time consumed to compute the pairwise GED cost matrix for 10 documents is 10*9/2=45 times 'x' units. The computation time of the GED cost matrix increases exponentially when the number of documents increases linearly.

At step 308, the processor 102 may be configured to generate a graph embedding vector for the graph object using a graph embedding neural network 112. The graph embedding neural network 112 may be trained to receive the graph object as input and generate the graph embedding vector for the graph object as output. The training of the graph embedding neural network 112 will be explained in greater detail later.

At step 310, the processor 102 may be configured to cluster the graph embedding vector to a cluster comprising similar looking templates of the document.

In one embodiment, the clustering approach, like partitional clustering such as K-means clustering, hierarchical clustering such as agglomerative clustering, or spectral clustering may be used to cluster the input documents.

Figure 4A:
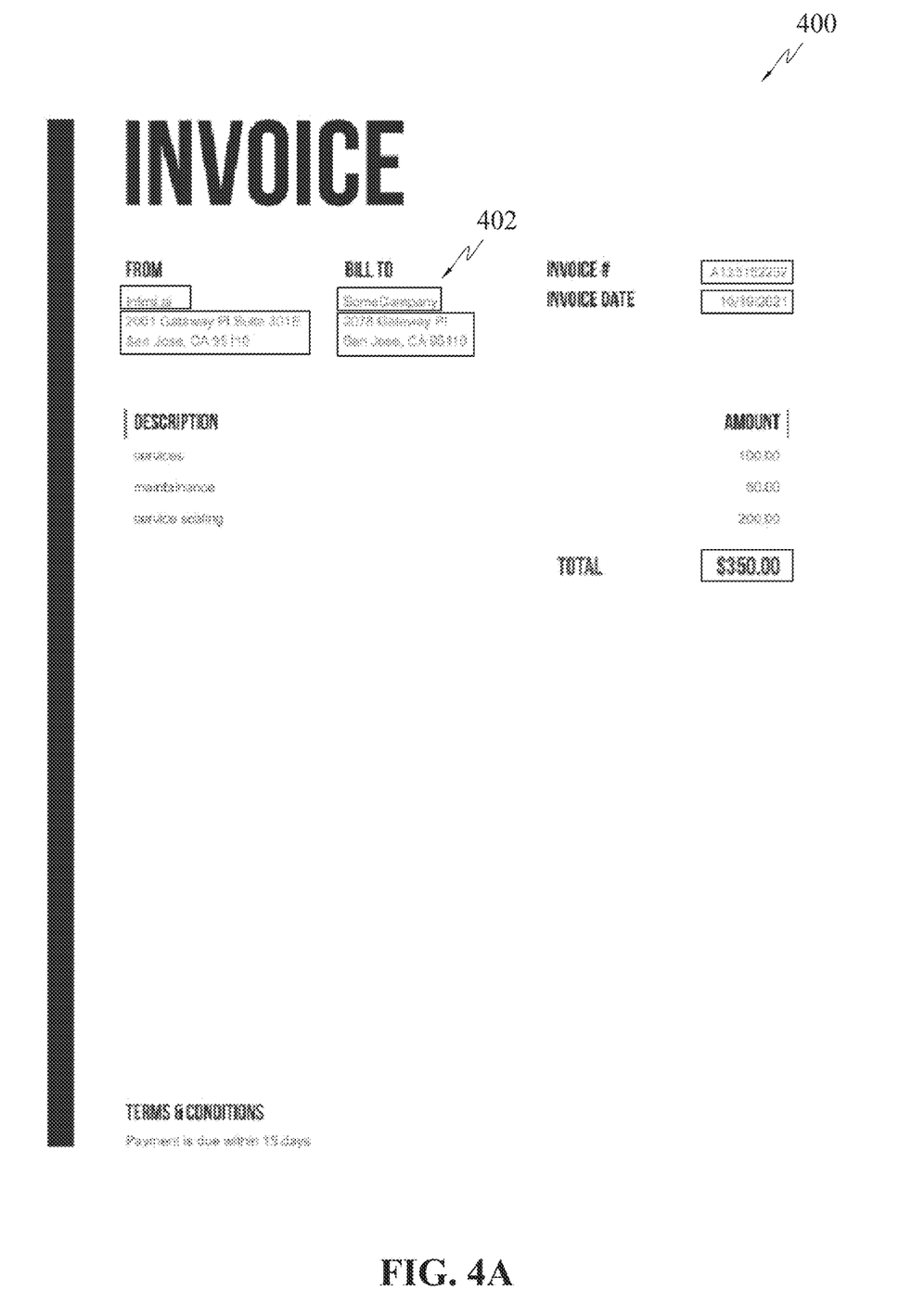
FIGS. 4A-4C illustrates the generation of graph object 406 for a document 400 belonging to a first template.
Figure 4B:
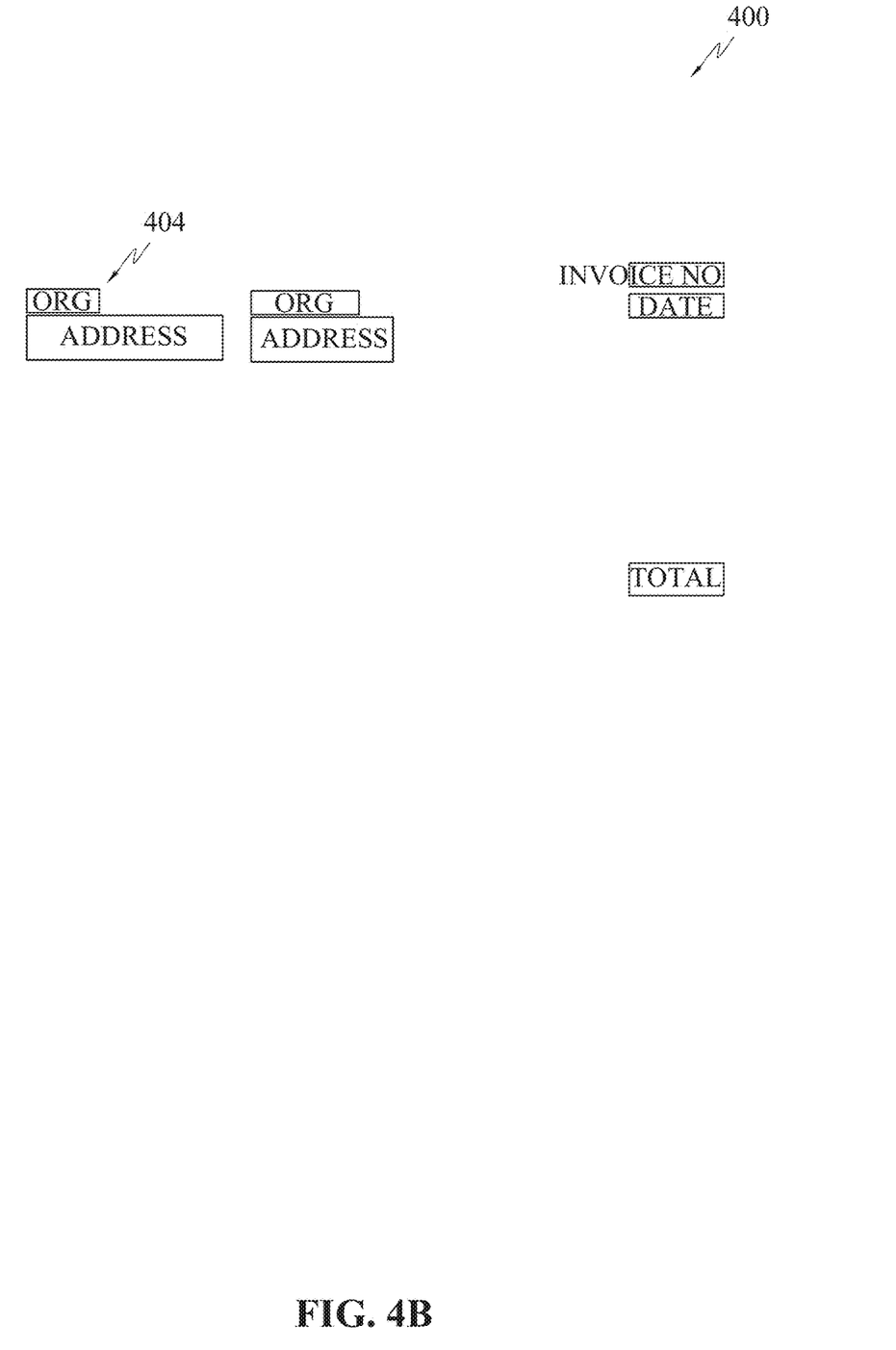
Figure 4C:
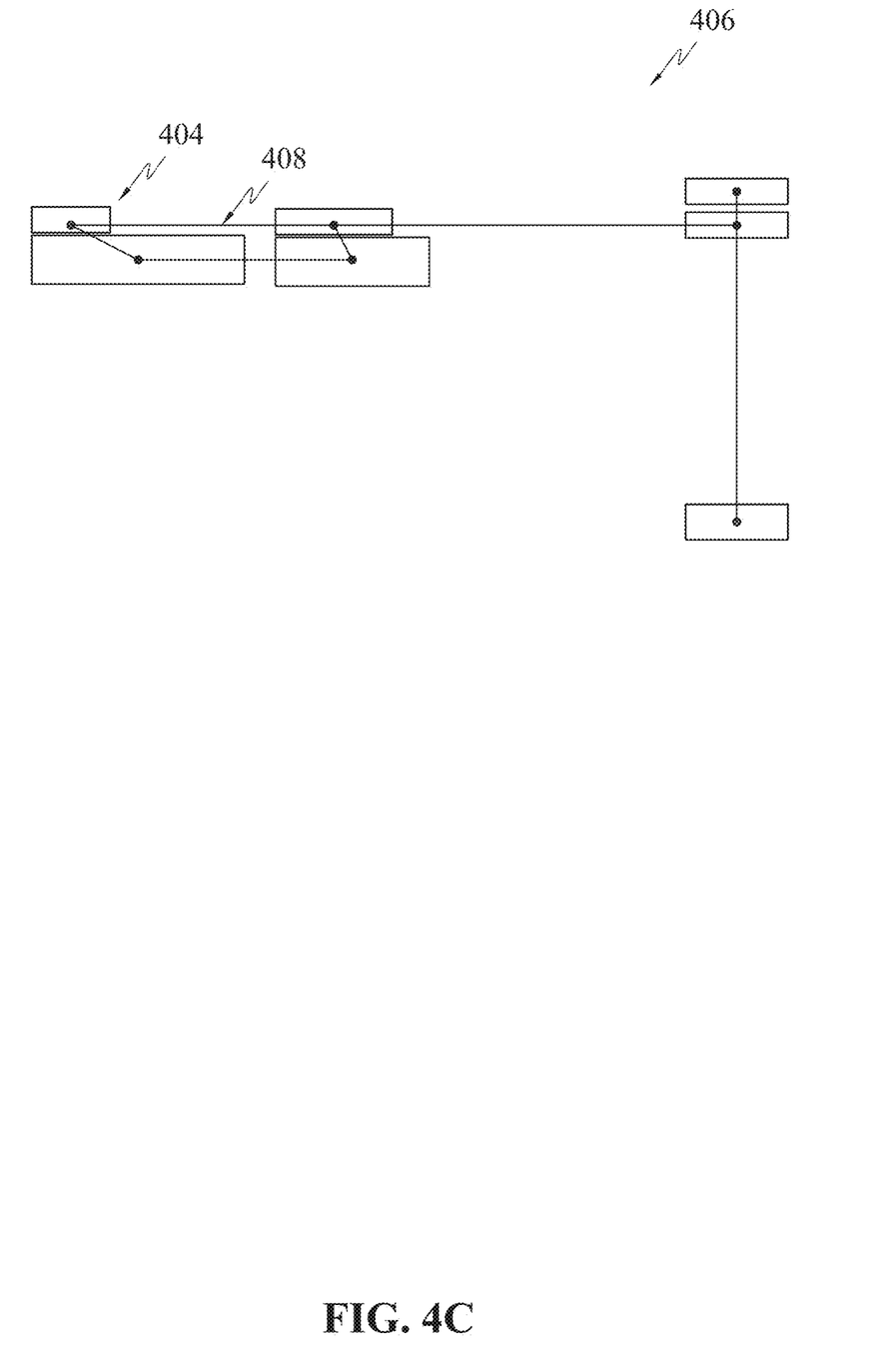

FIGS. 4A-4C illustrates the generation of graph object 406 for a document 400 belonging to a first template.

Referring to FIG. 4A, the entities 402 are identified in the document by the processor 102. Referring to FIG. 4B, the entities are labelled 404 by the processor 102. Referring to FIG. 4C, the entities are represented as a node 404 and edges 408 are formed between the nodes to create a graph object 406 for the document belonging to the first template.

Figure 5A:
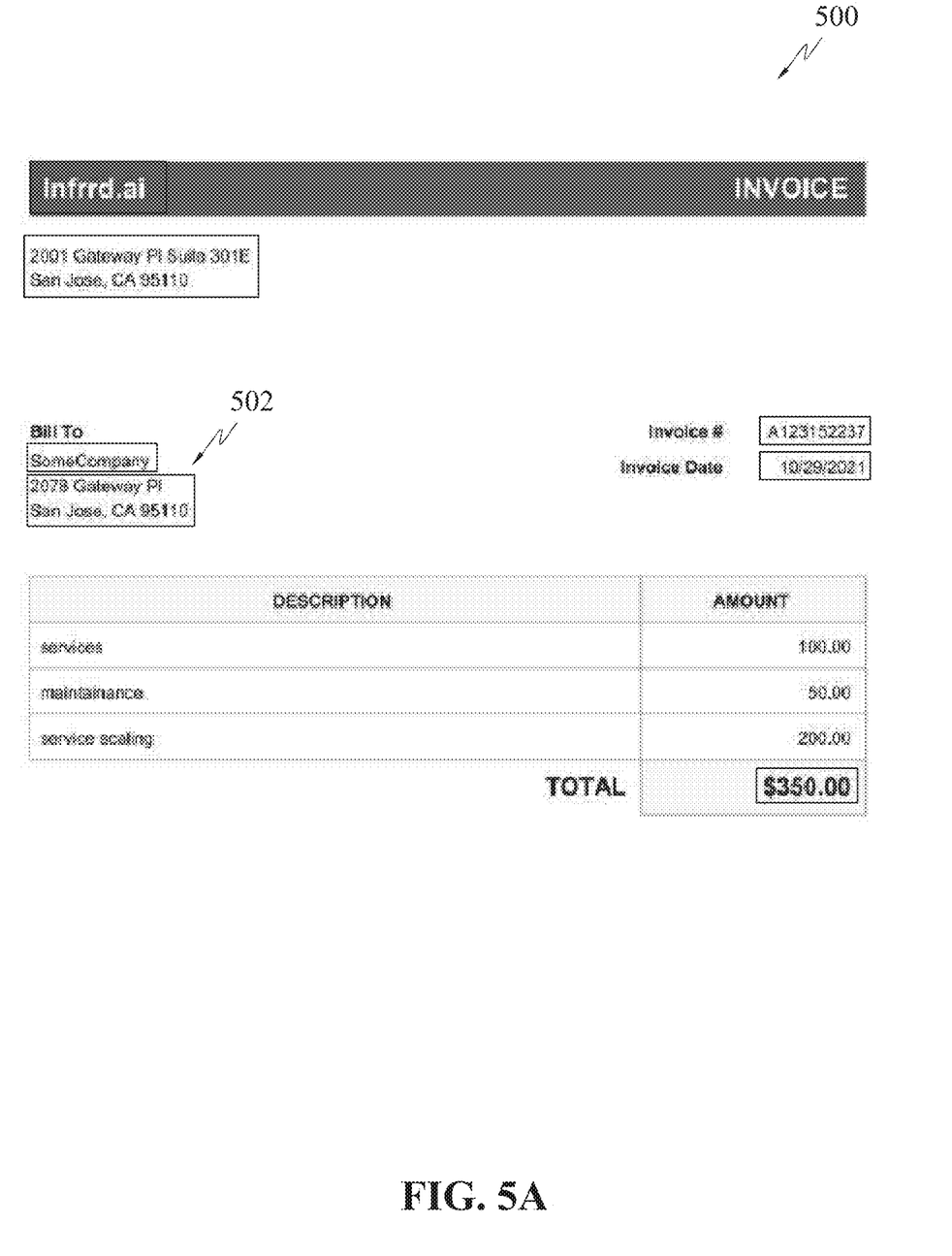
FIGS. 5A-5C illustrates the generation of graph object 506 for a document 500 belonging to a second template.
Figure 5B:
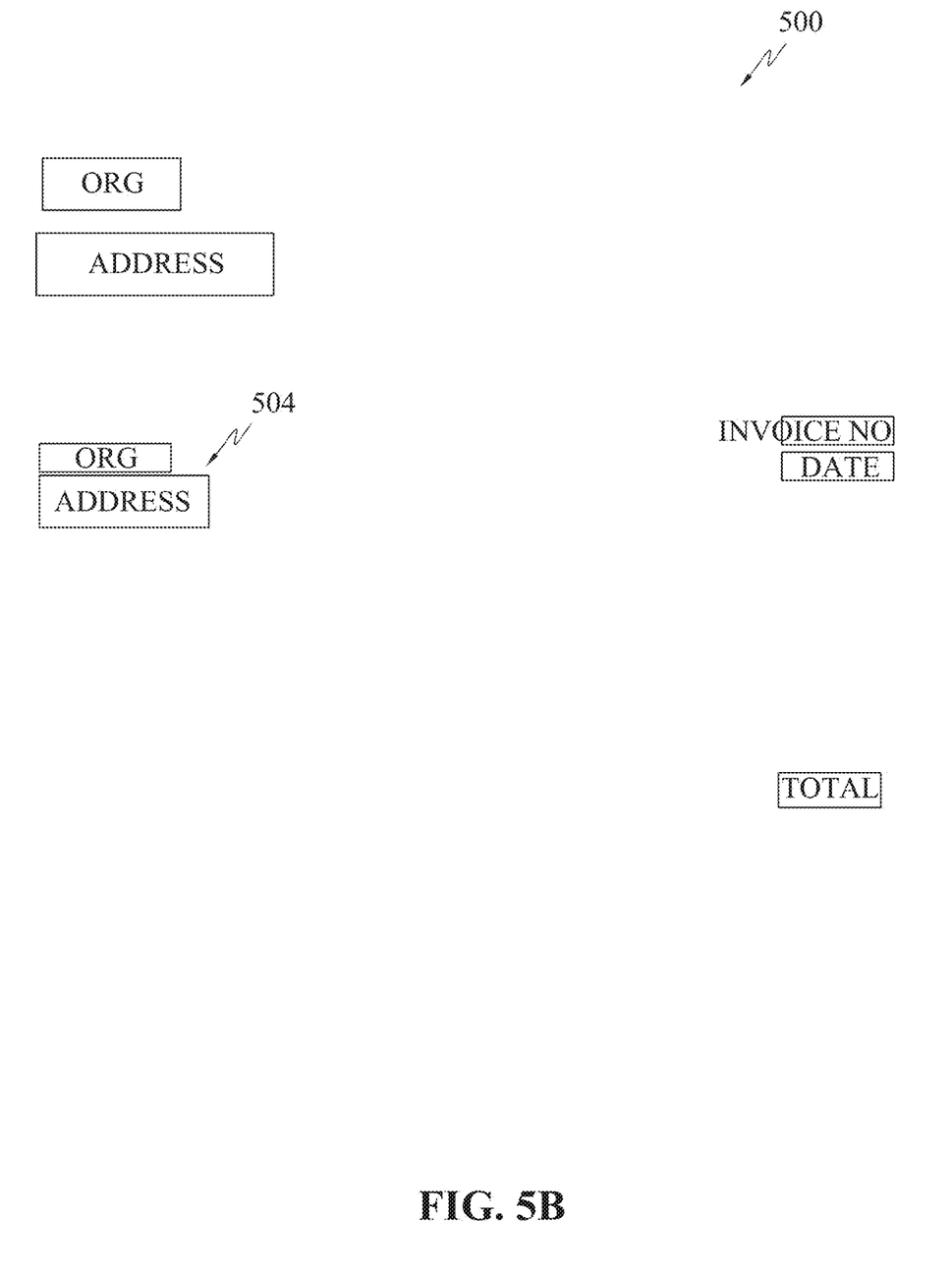
Figure 5C:
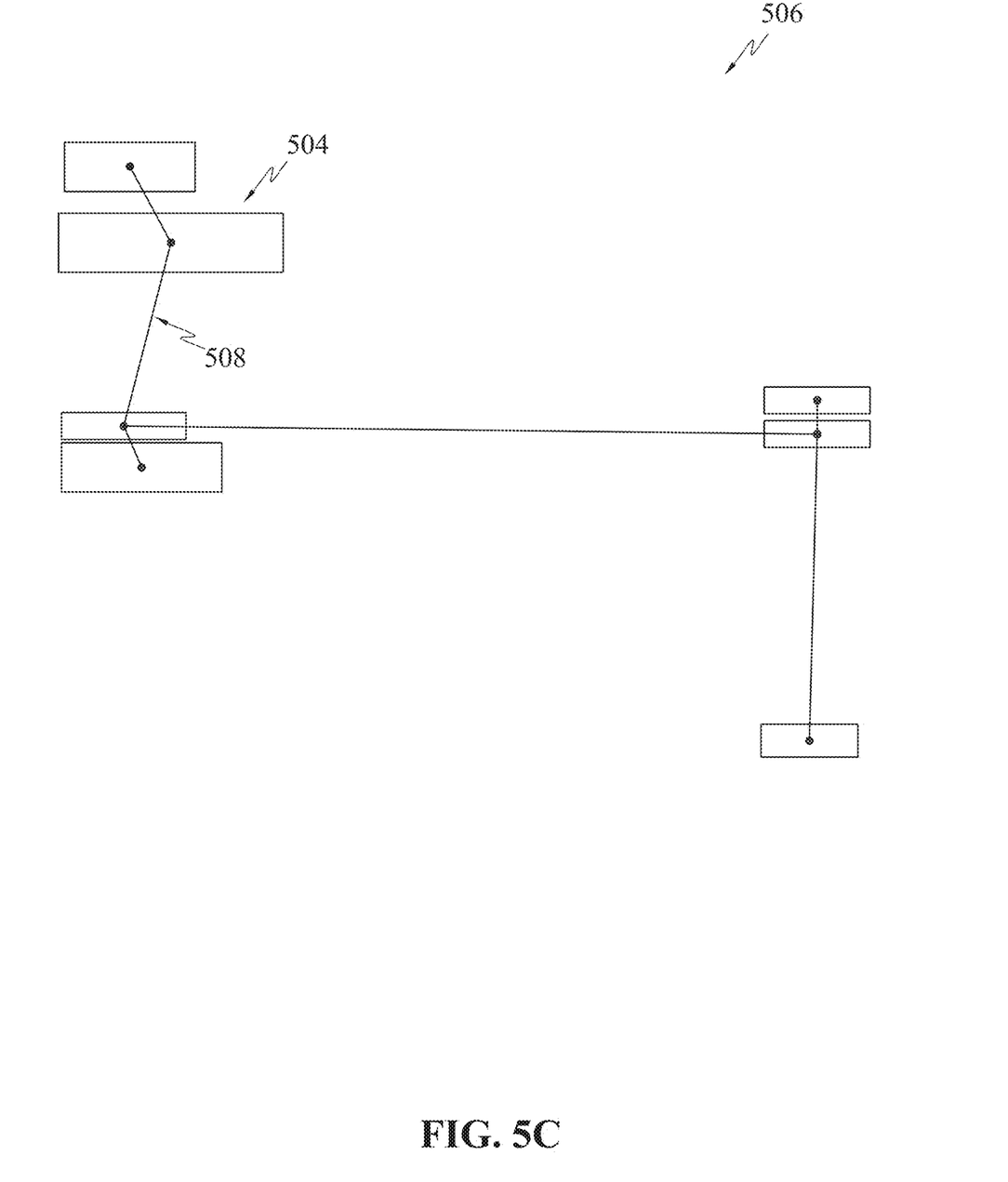

FIGS. 5A-5C illustrates the generation of graph object 506 for a document 500 belonging to a second template. As mentioned above, a graph object 506 is created for the document 500 belonging to the second template.

Similarly, graph objects may be generated for every document that is fed as input to the system.

Figure 6:
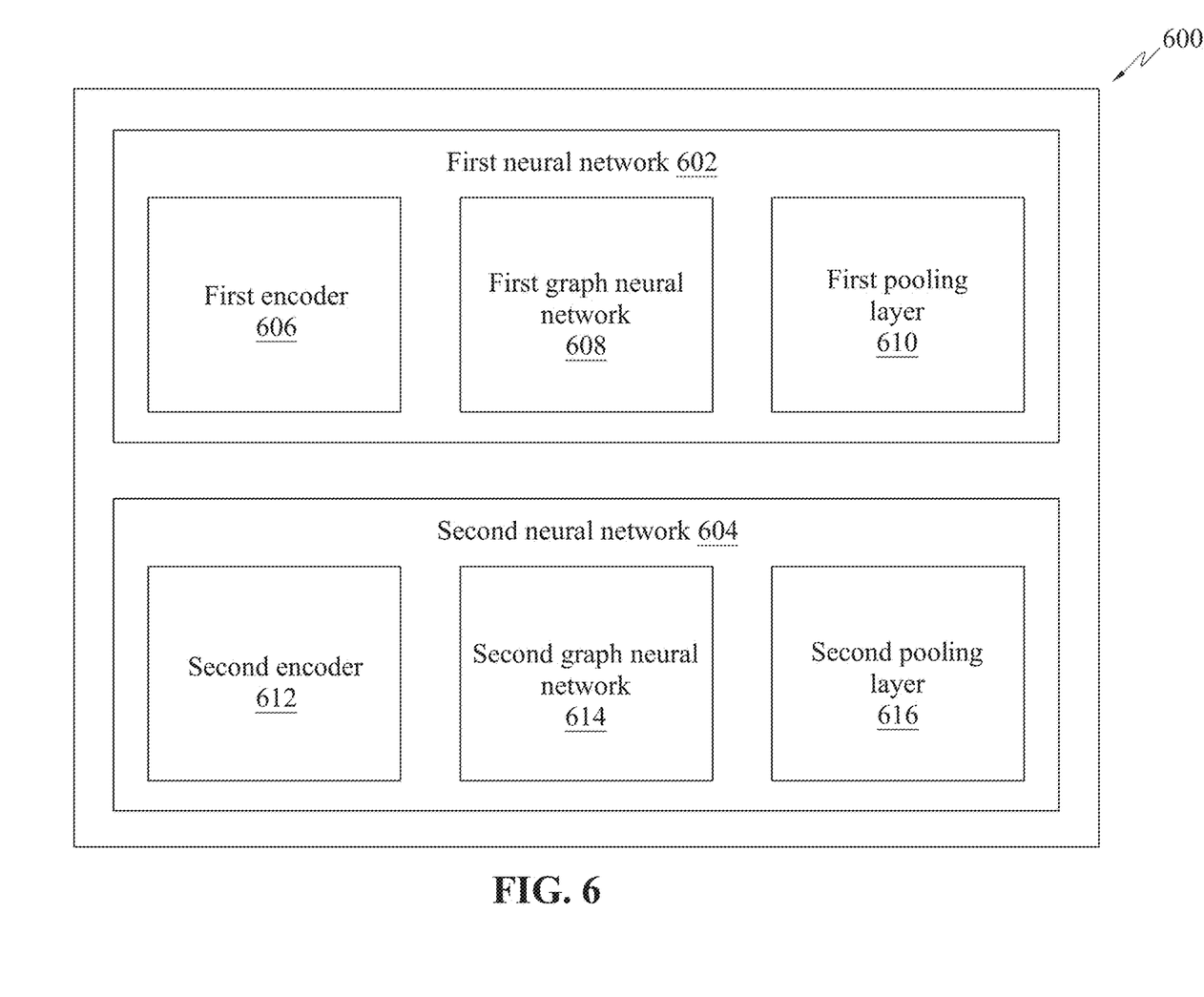
FIG. 6 illustrates an architecture 600 of a graph embedding neural network 112, in accordance with an embodiment.

FIG. 6 illustrates an architecture 600 of a graph embedding neural network 112, in accordance with an embodiment. The graph embedding neural network 112 while training may be a Siamese network. The graph embedding neural network 112 may comprise a first neural network 602 identical to a second neural network 604. The first neural network 602 may comprise a first encoder 606, a first graph neural network 608 and a first pooling layer 610. The second neural network 604 may comprise a second encoder 612, a second graph neural network 614 and a second pooling layer 616.

In one embodiment, the first encoder 606 and the second encoder 612 may be a multi-layer perceptron (MLP) that takes a graph object as input and projects the entity type information of each node into a predefined size vector, namely entity type embedding. The output vectors from the encoder are may then be used as node features for the first graph neural network 608 and the second graph neural network 614.

The graph neural network (608 and 614) may be used as a second stage in the encoding process to cover the local and location information which is missing in the first encoder and the second encoder. The local and location information of nodes such as its neighbours are encoded in the second stage. During the information propagation phase, every node will obtain the information from all its neighbour nodes at the current timestamp and use that information to update its own internal representation. With the increase in the timestamp, the information of the nodes gets propagated to more nodes within the graph. The final output of the graph neural network (608 and 614) is a set of rich node representations that are learned to encode the structural information about the document.

The last stage is the first pooling layer 610 and the second pooling layer 616. The pooling layer (610 and 616) may also be a multi-layer perceptron layer that learns to aggregate the node embeddings learned from the graph neural network module (608 and 614) and produce a predefined size vector to represent the graph embedding of the input graph.

Figure 7:
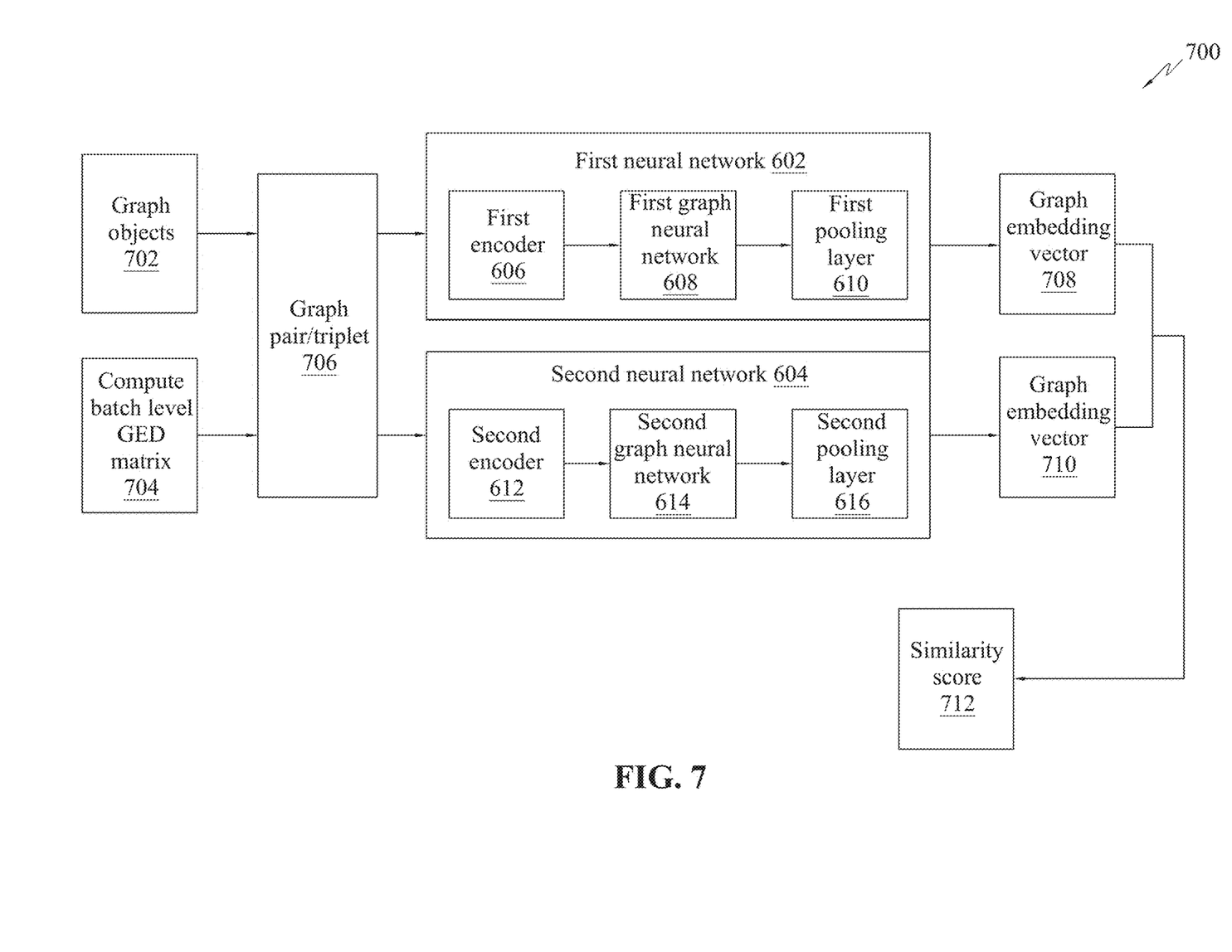
FIG. 7 illustrates the flowchart 700 of training of the graph embedding neural network 112, in accordance with an embodiment.

FIG. 7 illustrates the flowchart 700 of training of the graph embedding neural network 112, in accordance with an embodiment. The graph objects 702 for the training dataset are created, wherein the graph objects 702 include the entities that are labelled. Further, GED matrix 704 may be computed for a first batch of documents from the input training dataset. The processor 102 may configured to normalize the computed graph edit distance of the graph edit distance matrix to be between the range of 0 to 1.

A pair of graph objects for two documents and the computed GED matrix may be input to the graph embedding neural network 112. One of the pair of graph objects may be fed as input to the first neural network 602 and the other graph object may be fed as input to the second neural network 604. The graph embedding neural network 112 may generate a graph embedding vector (708 and 710) for each of the input graph objects.

In one embodiment, the generated graph embedding vector (708 and 710) may be a vector of the size 1×128.

A similarity score may be computed between the generated graph embedding vectors (708 and 710) corresponding to two graph objects. The similarity score may be calculated using a cosine similarity function.

The learning objective of the Siamese network is to learn to generate the similarity score as close to the 1 minus pre-computed normalized graph edit distance as possible. By optimizing this learning objective with the backpropagation, the Siamese network may learn to move similar graph embedding closer to each other if their normalized graph edit distance is small and vice versa.

The computation of GED between nodes is replaced by the graph embedding neural network 112, a neural network. The input to this graph embedding neural network 112 is a graph object obtained after labelling the entities. The output of this network is a graph embedding vector of 128-dimensions. The 128-dimensional vectors are used to form clusters of documents. The threshold is used to limit the number of clusters based on the selected clustering method.

The NP-hard problem of computation of GED distance is replaced with a trained neural network. The advantage of this method is a reduction in time and quick turnaround, flexibility, and more control in selecting a threshold value for the clustering process. The concept of the GED distance is replaced by a similarity score between the vectors that can be computed quickly.

Optimizing Training Dataset Comprising Sample Documents

The system 100 may be configured to optimize the training dataset that is clustered into clusters based on the template.

Figure 8:
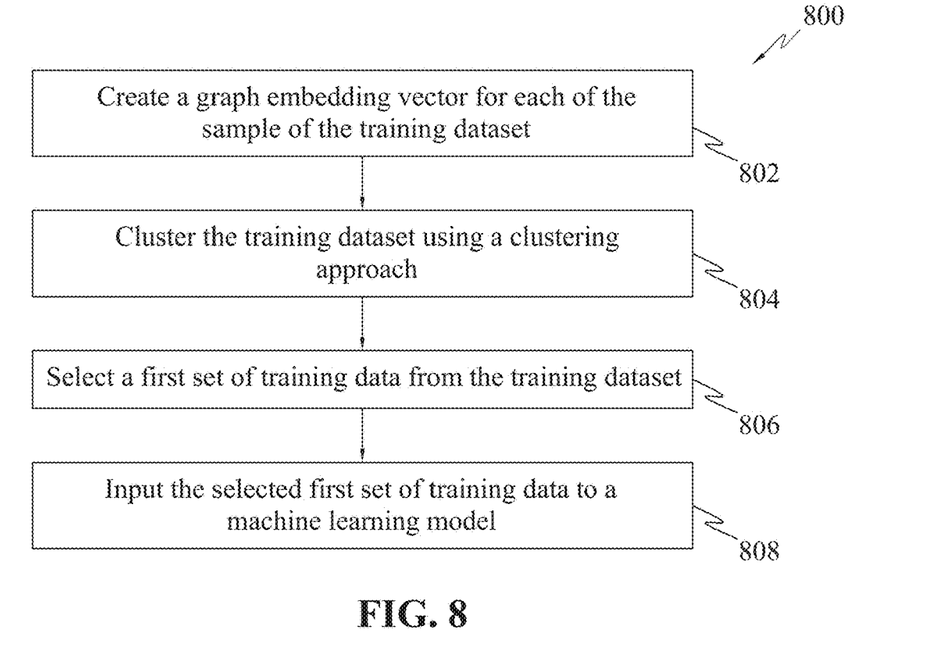
FIG. 8 is a flowchart 800 of optimizing training dataset, in accordance with an embodiment.

FIG. 8 is a flowchart 800 of optimizing training dataset, in accordance with an embodiment. At step 802, a graph embedding vector for each of the documents of the training dataset may be created using the processor 102.

At step 804, the processor 102 may cluster the graph embedding vectors into clusters based on the similarity between the graph embedding vectors. The clustering of the input documents may be performed using the foresaid graph-based clustering approach.

In one embodiment, the clustering approach, like partitional clustering such as K-means clustering, hierarchical clustering such as agglomerative clustering, or spectral clustering may be used to cluster the input documents.

Figure 9:
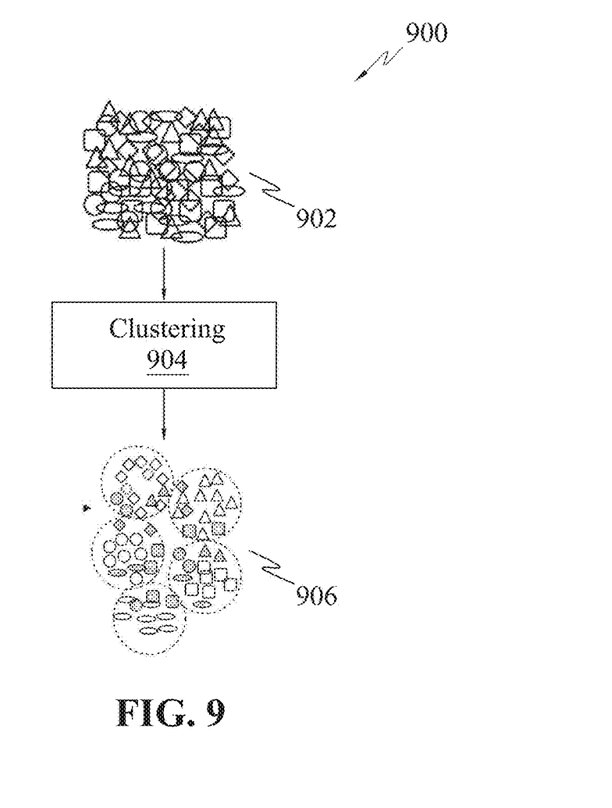
FIG. 9 illustrates clustering of samples into clusters based on similarity.

Referring to FIG. 9, the input samples 902 belonging to different templates (represented by different symbols) are segregated into different clusters 906 based on the similarity between the samples.

At step 806, an optimization module 114 may be configured to select a first set of training data from the clustered training dataset. The first set of training data may be a finite number of graph embedding vectors of the sample documents from the clustered training dataset.

At step 808, the selected first set of training data may be fed as input to a machine learning model. Therefore, only a part of the training dataset is input to machine learning model as training data thereby reducing the training time and operational costs.

Figure 10:
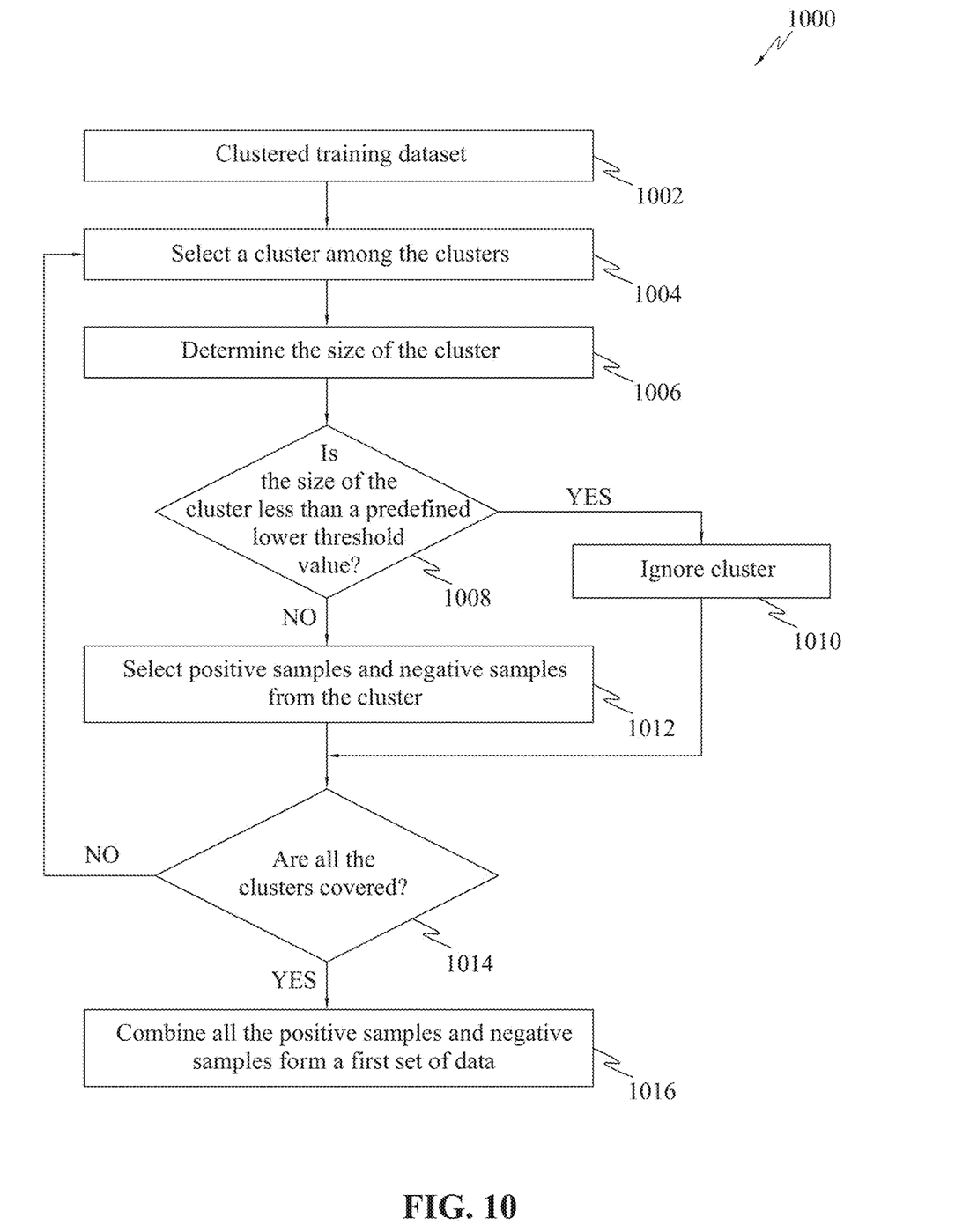
FIG. 10 is a flowchart 1000 of the process of selecting a first set of data from the training dataset.

FIG. 10 is a flowchart 1000 of the process of selecting a first set of data from the training dataset. At step 1002, the clustered training dataset may be fed as an input to the optimization module 114. The input clustered training dataset may be graph embedding vectors of the samples of the training dataset.

At step 1004, the processor 102 may select a cluster among multiple clusters of the training dataset.

At step 1006, the processor 102 may determine the size of the selected cluster, wherein the size of the cluster represents the number of graph embedding vectors of the sample documents in the cluster.

At step 1008, the processor 102 may determine whether the size cluster is less than a predefined lower threshold value.

If the size of the cluster is less than a predefined lower threshold value, at step 1010, the cluster may be ignored from being used and samples in the cluster are retained as an input training data for the machine learning model.

In one embodiment, the lower threshold value may be 100. In other words, if the number of samples in the cluster is less than 100, then the cluster may be ignored.

Further, at step 1014, the processor 102 may determine whether all the clusters are covered. If not, the processor 102 may select another cluster at step 1002. If all the clusters are covered, then the processor 102, at step 1016, may combine the positive and negative samples from the clusters to obtain the first set of data.

If the size of the cluster is not less than a predefined lower threshold value, at step 1012, the processor 102 may select positive samples and negative samples from the cluster for the first set of data.

In an embodiment, the number of samples in the first set of data is based on a predefined upper threshold value.

Figure 11:
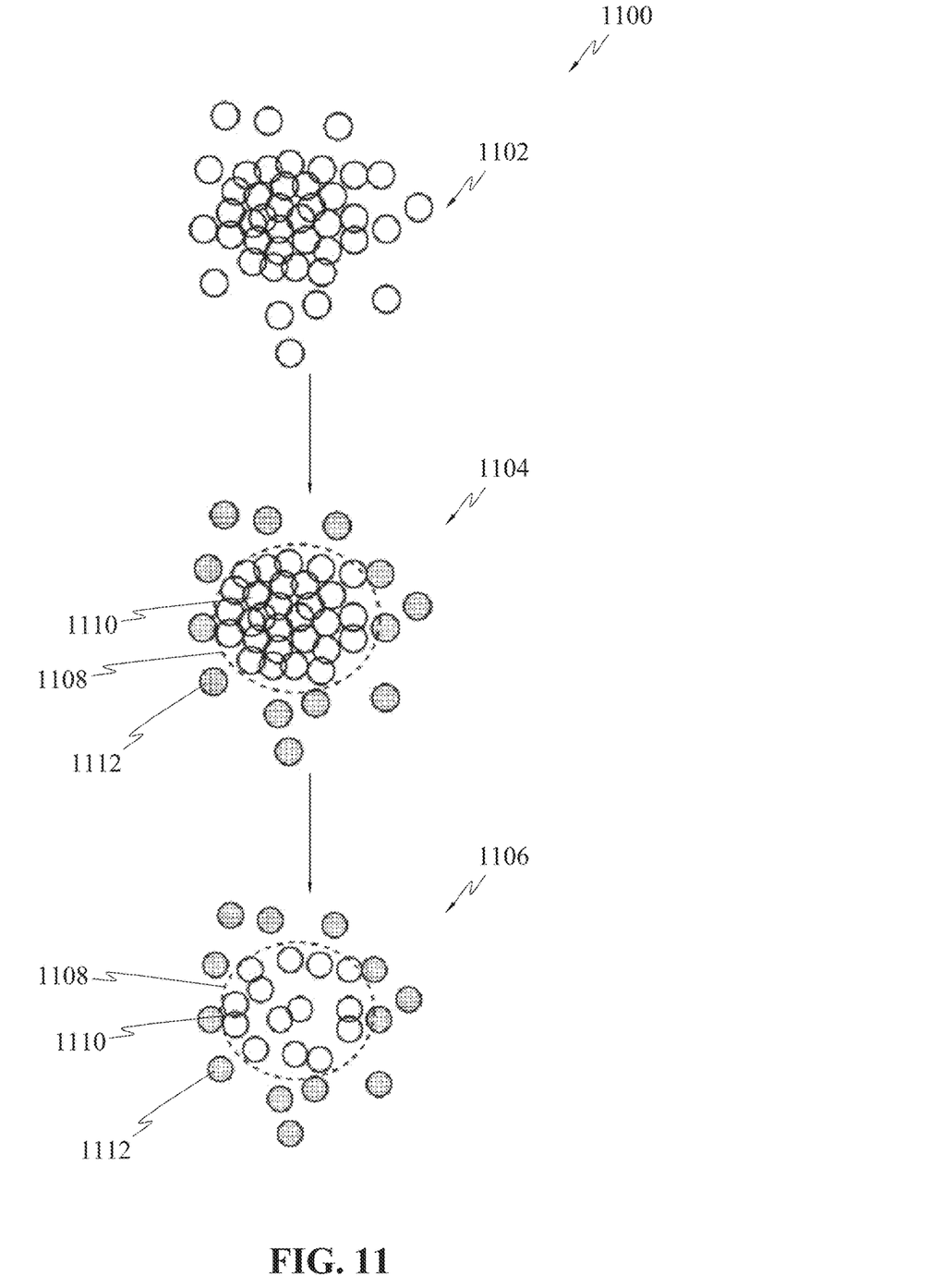
FIG. 11 illustrates the selection of samples from the cluster, in accordance with an embodiment.

FIG. 11 illustrates the selection of samples from the cluster, in accordance with an embodiment. The cluster 1102 comprises a group of documents clustered based on the similarity using a clustering technique.

The cluster 1102 comprises a boundary 1108 that separates the interior samples and the outliers. The samples within the boundary 1108 may be positive samples 1110 and the samples that are outside the boundary 1108 may be negative samples 1112.

At step 1106, certain number of positive samples 1110 (samples within the boundary) may be selected by the processor 102 for the first set of training data. Similarly, certain number of negative samples 1112 may be selected by the processor 102 for the first set of training data.

In an embodiment, the number of positive samples selected may be between the lower threshold value and the upper threshold value, if the size of the cluster is less than or equal to the upper threshold value.

In an embodiment, the number of positive samples selected may be equal to the upper threshold value, if the size of the cluster is greater than the upper threshold value.

In an embodiment, the number of negative samples selected may be equal to 10% of the number of positive samples selected.

In one embodiment, the upper threshold value may be 500.

In one embodiment, each of the graph embedding vectors of the sample documents in the cluster may include a threshold score. The positive samples may comprise of graph embedding vectors with threshold score in the range of 0.4-0.5 and the negative samples may comprise of graph embedding vectors with threshold score above 0.5.

In one embodiment, the processor 102 may be configured to select the positive samples that are within the boundary of the cluster.

In one embodiment, the number of graph embedding vectors in the first set of training data may be less than or equal to the number of graph embedding vectors of the sample documents of the training dataset.

It shall be noted that the processes described above are described as sequence of steps: this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader scope of the system 100 and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. A system for reducing computation resource used by a data processing system for training a machine leaning model for classifying documents, the system comprising one or more processors configured to:
   receive a training dataset comprising digital copies of sample documents;
   create graph embedding vector for each of the sample documents;
   cluster the graph embedding vectors of the sample documents of the training dataset into clusters based on the similarity between the graph embedding vectors;
   select a first set of training data comprising a subset of the graph embedding vectors, wherein selecting the first set of training data comprises:
      selecting a subset of the clusters; and
      selecting graph embedding vectors from the selected clusters, wherein graph embedding vectors are selected from each of the selected clusters, and wherein in one or more of the selected clusters, having the graph embedding vectors more than a predefined upper threshold value, only a subset of the graph embedding vectors is included in the first set of training data; and
   input the first set of training data as input training data for the machine learning model.

2. The system as claimed in claim 1, wherein to select the subset of the clusters, the one or more processor is configured to:
   determine the size of the cluster, wherein the size of the cluster represents the number of graph embedding vectors of the sample documents in the cluster;
   if the size of the cluster is less than a predefined lower threshold value, the cluster is ignored from being used and samples in the cluster are retained as an input training data for the machine learning model; and
   else, a finite number of graph embedding vectors of the sample documents is selected from the cluster as the first set of training data, wherein the finite number of the graph embedding vectors in the first set of training data is based on the predefined upper threshold value.

3. The system as claimed in claim 2, wherein the selected first set of training data from the clustered training data further comprises:
positive samples, wherein the positive samples include the graph embedding vectors of the cluster that are within a boundary of the cluster; and
negative samples, wherein the negative samples include the graph embedding vectors of the cluster that are outside the boundary of the cluster.

4. The system as claimed in claim 3, wherein the number of positive samples is between the lower threshold value and the upper threshold value, if the size of the cluster is less than or equal to the upper threshold value.

5. The system as claimed in claim 3, wherein the number of positive samples selected is equal to the upper threshold value, if the size of the cluster is greater than the upper threshold value.

6. The system as claimed in claim 3, wherein the number of negative samples selected is equal to 10% of the number of positive samples selected.

7. The system as claimed in claim 3, wherein:
each of the graph embedding vectors of the sample documents in the cluster includes a threshold score;
the positive samples comprise of graph embedding vectors with threshold score in the range of 0.4-0.5; and
the negative samples comprise of graph embedding vectors with threshold score above 0.5.

8. The system as claimed in claim 3, wherein the one or more processors is configured to combine the positive samples and the negative samples selected from each of the clusters to obtain the first set of training data to be input to the machine learning model.

9. The system as claimed in claim 2, wherein:
the lower threshold value is 100; and
the upper threshold value is 500.

\* \* \* \* \*